US009619732B2

(12) United States Patent
Murphy-Chutorian et al.

(10) Patent No.: US 9,619,732 B2
(45) Date of Patent: Apr. 11, 2017

(54) GENERATING COMPOSITIONS

(71) Applicant: Google Inc., Mountain View, CA (US)

(72) Inventors: Erik Murphy-Chutorian, Palo Alto, CA (US); Matthew Steiner, Los Altos, CA (US); Vivek Kwatra, Santa Clara, CA (US); Shengyang Dai, San Jose, CA (US); John Spiegel, Los Angeles, CA (US); Nicholas Butko, Mountain View, CA (US); Falk Sticken, Lübeck (DE); Florian Kriener, Leubeck (DE); Tom Binder, Luebeck (DE); John Flynn, Venice, CA (US); Troy Chinen, Newark, CA (US); Steven Vandebogart, Los Angeles, CA (US); Nikolaos Trogkanis, Mountain View, CA (US); Ingo Wehmeyer, Lübeck (DE); Matthias Grundmann, San Jose, CA (US)

(73) Assignee: Google Inc., Mountain View, CA (US)

( * ) Notice: Subject to any disclaimer, the term of this patent is extended or adjusted under 35 U.S.C. 154(b) by 15 days.

(21) Appl. No.: 14/791,692

(22) Filed: Jul. 6, 2015

(65) Prior Publication Data
US 2016/0034785 A1    Feb. 4, 2016

Related U.S. Application Data

(63) Continuation of application No. 13/894,335, filed on May 14, 2013, now Pat. No. 9,076,270.

(51) Int. Cl.
*G06K 9/62* (2006.01)
*G06T 11/60* (2006.01)
(Continued)

(52) U.S. Cl.
CPC ..... *G06K 9/6218* (2013.01); *G06F 17/30247* (2013.01); *G06K 9/00228* (2013.01); *G06K 9/00677* (2013.01); *G06T 11/60* (2013.01)

(58) Field of Classification Search
CPC ..... G06T 3/4038; G06T 11/60; H04N 1/3876; H04N 5/23238; G06K 2009/2045
See application file for complete search history.

(56) References Cited

U.S. PATENT DOCUMENTS 6,898,300 B1   5/2005   Iwaki
8,254,679 B2 * 8/2012   Marchesotti ......... G06T 7/0081
                                                            382/173
(Continued)

FOREIGN PATENT DOCUMENTS

EP    0751473 B1   5/2001
EP    1693782 A1   8/2006
EP    1858251 B1   1/2011

OTHER PUBLICATIONS

Cao, Liangliang et al. "Annotating Collections of Photos Using Hierarchical Event and Scene Models." 2008 IEEE Conference on Computer Vision and Pattern Recognition. pp. 1-8. Jan. 1, 2008.
(Continued)

*Primary Examiner* — Duy M Dang
(74) *Attorney, Agent, or Firm* — IP Spring

(57) ABSTRACT

Implementations generally relate to generating compositional media content. In some implementations, a method includes receiving a plurality of photos from a user, and determining one or more composition types from the photos. The method also includes generating compositions from the selected photos based on the one or more determined composition types. The method also includes providing the one or more generated compositions to the user.

20 Claims, 13 Drawing Sheets

(51) Int. Cl.
*G06K 9/00* (2006.01)
*G06F 17/30* (2006.01)

(56) References Cited

U.S. PATENT DOCUMENTS

| | | | |
|---|---|---|---|
| 9,076,270 B2* | 7/2015 | Murphy-Chutorian | G06K 9/00677 |
| 2009/0060383 A1* | 3/2009 | Li | G06K 9/00597 382/282 |
| 2010/0053323 A1* | 3/2010 | Izawa | H04N 5/23212 348/136 |
| 2010/0092085 A1 | 4/2010 | Marchesotti | |
| 2011/0087666 A1* | 4/2011 | Chou | G06F 17/30247 707/737 |
| 2011/0096995 A1* | 4/2011 | Ito | G06F 17/30256 382/190 |
| 2012/0027293 A1 | 2/2012 | Cok | |
| 2012/0293685 A1 | 11/2012 | Garten | |
| 2013/0076947 A1 | 3/2013 | Hirakawa | |

OTHER PUBLICATIONS

European Patent Office, International Search Authority. International Search Report for related International (PCT) Application No. PCT/US2014/037794. 4 pages. Sep. 4, 2014.

International Bureau of WIPO, International Preliminary Report on Patentability for International Patent Application No. PCT/US2014/037794, 6 pages.

\* cited by examiner

400

500

600

800

900

GENERATING COMPOSITIONS

CROSS REFERENCE TO RELATED APPLICATIONS

The present application is a continuation of U.S. patent application Ser. No. 13/894,335, filed May 14, 2013 and titled GENERATING COMPOSITIONS, which is incorporated herein by reference in its entirety.

BACKGROUND

Social network systems often enable users to upload photos and to create photo albums. Social network system also enables users to share photos with each other. For example, users can share photos with friends and family, which provides enjoyable and bonding experiences among users of social network systems. A user can create a photo album that is associated with the user's profile. As owner of the photo album, the user can then allow other users to view the photo album when visiting the photo section of the user's profile.

SUMMARY

Implementations generally relate to generating compositions. In some implementations, a method includes receiving a plurality of photos from a user, and determining one or more composition types from the photos. The method also includes generating compositions from the selected photos based on the one or more determined composition types. The method also includes providing the one or more generated compositions to the user.

With further regard to the method, in some implementations, the one or more composition types include face compositions. In some implementations, the one or more composition types include high dynamic range compositions. In some implementations, the one or more composition types include panorama compositions. In some implementations, the one or more composition types include photo booth compositions. In some implementations, the determining of the one or more composition types includes clustering the photos based on one or more clustering criteria. In some implementations, the generating of compositions includes: selecting a first photo from the plurality of photos, where the selected photo includes an image of a face, where the face in the first photo includes at least one first element, and where, in the first photo, the at least one first element lacks a first desired characteristic; selecting a second photo from the plurality of photos, where the second photo includes an image of the face, where the face in the second photo includes the at least one first element, and where, in the second photo, the at least one first element has the first desired characteristic; and replacing the first element of the first photo with the first element of the second photo. In some implementations, the generating of compositions includes: selecting photos from the plurality of photos, where the selected photos include a target subject matter, and where the selected photos are captured at different exposure levels; and generating a high dynamic range composition of the target subject matter based on exposure level information from the selected photos. In some implementations, the generating of compositions includes selecting photos from the plurality of photos, where the selected photos are associated with a location; and combining the photos into a panorama composition of the location. In some implementations, the generating of compositions includes: selecting photos from the plurality of photos, where the selected photos include different target subject matter; and combining the selected photos into a photo booth composition. In some implementations, wherein the generating of compositions includes applying one or more of a merging algorithm and an anti-ghosting algorithm in a high dynamic range composition.

In some implementations, a method includes receiving a plurality of photos from a user, and determining one or more composition types from the photos, where the one or more composition types include one or more of face compositions, high dynamic range compositions, panorama compositions, and photo booth compositions, and where the determining include clustering the photos based on one or more clustering criteria. The method also includes generating compositions from the selected photos based on the one or more determined composition types, and providing the one or more generated compositions to the user. With further regard to the method, in some implementations, the clustering criteria include photos taken within a predetermined time period.

In some implementations, a system includes one or more processors, and logic encoded in one or more tangible media for execution by the one or more processors. When executed, the logic is operable to perform operations including: receiving a plurality of photos from a user, and determining one or more composition types from the photos. The logic when executed is further operable to perform operations including generating compositions from the selected photos based on the one or more determined composition types, and providing the one or more generated compositions to the user.

With further regard to the system, in some implementations, the one or more composition types include one or more of face compositions, high dynamic range compositions, panorama compositions, and photo booth compositions. In some implementations, to determine the one or more composition types, the logic when executed is further operable to perform operations including clustering the photos based on one or more clustering criteria. In some implementations, to generate compositions, the logic when executed is further operable to perform operations including: selecting a first photo from the plurality of photos, where the selected photo includes an image of a face, where the face in the first photo includes at least one first element, and where, in the first photo, the at least one first element lacks a first desired characteristic; selecting a second photo from the plurality of photos, where the second photo includes an image of the face, where the face in the second photo includes the at least one first element, and where, in the second photo, the at least one first element has the first desired characteristic; and replacing the first element of the first photo with the first element of the second photo. In some implementations, to generate compositions, the logic when executed is further operable to perform operations including: selecting photos from the plurality of photos, where the selected photos include a target subject matter, and where the selected photos are captured at different exposure levels; and generating a high dynamic range composition of the target subject matter based on exposure level information from the selected photos. In some implementations, to generate compositions, the logic when executed is further operable to perform operations including: selecting photos from the plurality of photos, where the selected photos are associated with a location; and combining the photos into a panorama composition of the location. In some implementations, to generate compositions, the logic when executed is further operable to perform operations including: selecting photos from the plurality of photos, where the selected photos include different target subject matter; and combining the selected photos into a photo booth composition.

DETAILED DESCRIPTION

Implementations described herein generate compositional media content. In various implementations, a system receives photos from a user. The system then determines one or more composition types from the photos. In various implementations, the one or more composition types may include face compositions, high dynamic range compositions, panorama compositions, and photo booth compositions. In some implementations, to determine the one or more composition types, the system may cluster the photos based on one or more clustering criteria. The system then generates compositions from the selected photos based on the one or more determined composition types. The system then provides the one or more generated compositions to the user.

In some implementations, the system generates compositions involving face compositions. For example, the system may select a first photo from the plurality of photos, where the selected photo includes an image of a face, where the face in the first photo includes at least one first element (e.g., a mouth), and where, in the first photo, the at least one first element lacks a first desired characteristic (e.g., smiling). The system then identifies a second photo from the plurality of photos, where the second photo includes an image of the face, where the face in the second photo includes the first element, and where, in the second photo, the first element has the first desired characteristic. The system then replaces the first element of the first photo with the first element of the second photo.

In some implementations, the system generates compositions involving high dynamic range images. For example, the system may select photos from the plurality of photos, where the selected photos include a target subject matter, and where the selected photos are captured at different exposure levels. The system then generates a high dynamic range composition of the target subject matter based on exposure level information from the selected photos.

In some implementations, the system generates compositions involving panorama compositions. For example, the system may select photos from the plurality of photos, where the selected photos are associated with a location. The system then combines the photos into a panorama composition of the location.

In some implementations, the system generates compositions involving photo booth compositions. For example, the system may select photos from the plurality of photos, where the selected photos include different target subject matter. The system then combines the selected photos into a photo booth composition.

Figure 1:
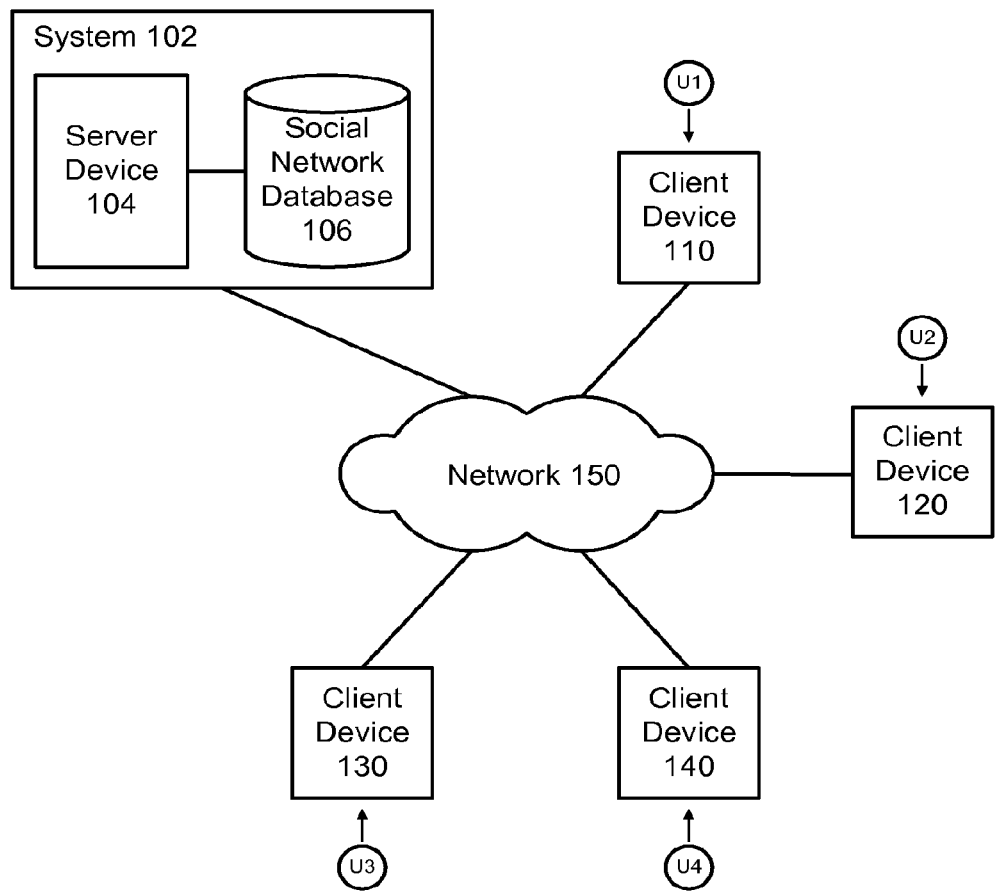
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other, where respective client devices 110, 120, 130, and 140 transmit compositional media content to each other.

Figure 2:
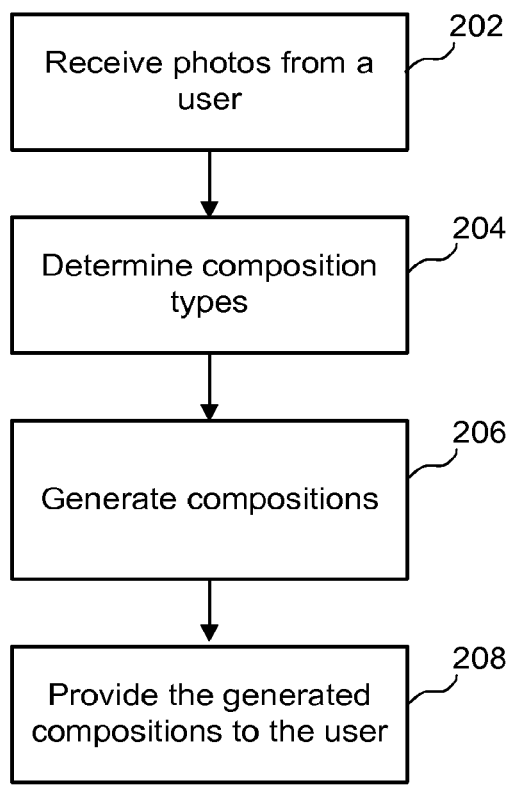
FIG. 2 illustrates an example simplified flow diagram for generating compositions, according to some implementations.

FIG. 2 illustrates an example simplified flow diagram for generating compositions, according to some implementations. In various implementations, system 102 may generate compositions in a social network system, or anywhere visual media may be used and/or viewed. Referring to both FIGS. 1 and 2, a method is initiated in block 202, where system 102 receives photos from a user. In various implementations, the photos may be received when the user uploads the photos to system 102 or after the user adds the photos to one or more photo albums. In some implementations, system 102 may enable a camera device (e.g., smart phone) of the user to automatically upload photos to system 102 as the camera device captures photos.

In block 204, system 102 determines one or more composition types from the photos. In some implementations, system 102 automatically determines the composition types from the photos upon receiving the photos. The composition types may include one or more of face compositions, high dynamic range compositions, panorama compositions, and/or photo booth compositions. As described in more detail below, system 102 determines which types of compositions that can be generated from the photos. To do so, in various implementations, system 102 analyzes the photos to determine which photos are appropriate for each type of composition. For example, photos captured in burst mode (e.g., photos captured in quick succession) of a similar scene such as a landscape at the same exposure might make a visually appealing panoramic photo. However, some of these photos may not be appropriate for an HDR image since the photos were taken with the same exposure.

In various implementations, to determine the composition types that can be made from the photos, system 102 utilizes recognition algorithms to find photos appropriate for different composition types. For example, system 102 may utilize recognition algorithms to determine visual similarity among photos (e.g., similarity of any persons in the photos), and may utilize exchangeable image file format (EXIF) metadata to determine the elapsed time between photos. Example implementations of recognition algorithms are described in more detail below.

In some implementations, system 102 may use signals from recognition algorithms and from EXIF metadata in a hierarchical clustering algorithm, with potentially varying constraints per media type, in order to group constituent photos into photo bursts. In some implementations, system 102 may also use signals from social affinity data in a hierarchical clustering algorithm in order to group constituent photos into photo bursts.

In various implementations, to determine the composition types that can be made from the photos, system 102 utilizes clustering algorithms to cluster the photos based on one or more clustering criteria. For example, in some implementations, the clustering criteria may include photos taken within a predetermined time period. In some implementations, the clustering criteria may include photos having similar content. In some implementations, the clustering criteria may include photos having the same content.

In various implementations, system 102 combines these example clustering criteria and other clustering criteria in a variety of ways in clustering algorithms to determine the composition types that can be made from the photos.

In some implementations, if system 102 clusters two or more photos that have the same content, system 102 may determine that the two or more photos may be used to generate a face composition. For example, system 102 may determine that photos in a photo burst having the same face are candidate photos for a face composition.

In some implementations, if system 102 clusters two or more photos that have the same content and are captured in series at different exposure levels, system 102 may determine that the two or more photos may be used to generate a high dynamic range (HDR) composition.

In some implementations, if system 102 clusters two or more photos that have similar content, system 102 may determine that the two or more photos may be used to generate a panorama composition.

In some implementations, if system 102 clusters two or more photos that have different content, system 102 may determine that the two or more photos may be used to generate a photo booth composition.

Referring again to FIG. 2, in block 206, system 102 generates one or more compositions from the selected photos based on the one or more determined composition types. In various implementations, to generate compositions from the photos, system 102 selects candidate photos from the group of photos based on the determined composition types. Continuing with the example above, system 102 may select photos in a photo burst with multiple faces and one ore more non-smiling and/or eyes-closed faces for face compositions. More example implementations of selecting photos for various composition types are described in more detail below in connection with descriptions of each composition type.

Continuing with the example above, system 102 may generate a face composition using selected photos from a group of photos to generate a face composition. More example implementations for generating compositions are described in more detail below in connection with descriptions of each composition type.

In block 208, system 102 provides the one or more generated compositions to the user. For example, in some implementations, system 102 may send a message to the user indicating that system 102 has generated a composition and has added the composition to the user's upload stream or photo album. In various implementations, system 102 may generate and cause a visual badge to overlay an image associated with the composition. In various implementations, system 102 may generate and cause a second or combined visual badge to overlay the composition, where the visual badge indicates the type of composition (e.g., a face composition, HDR composition, panorama composition, photo booth composition, etc.).

Figure 3:
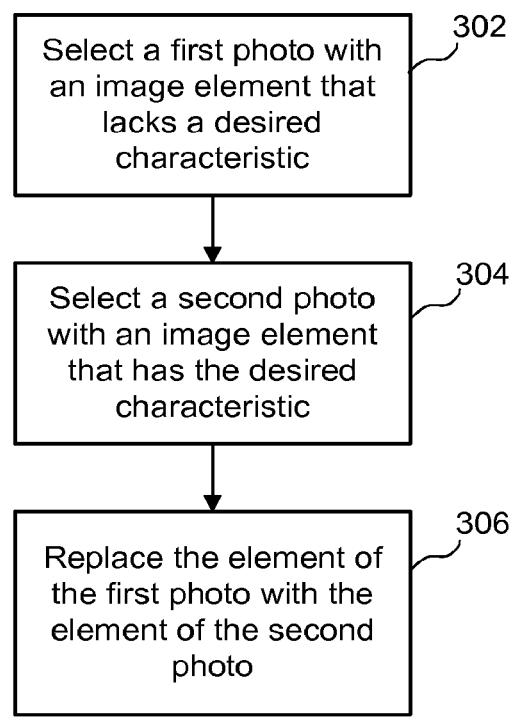
FIG. 3 illustrates an example simplified flow diagram for generating a face composition, according to some implementations.

FIG. 3 illustrates an example simplified flow diagram for generating a face composition, according to some implementations. Referring to both FIGS. 1 and 3, a method is initiated in block 302, where system 102 selects a first photo from the group of photos, where the selected photo includes an image of a face. In various implementations, the face in the first photo includes one or more elements (e.g., eyes, mouth, etc.), where at least one element in the first photo lacks a predetermined desired characteristic. For example, the eyes in the first photo may be closed.

Figure 4:
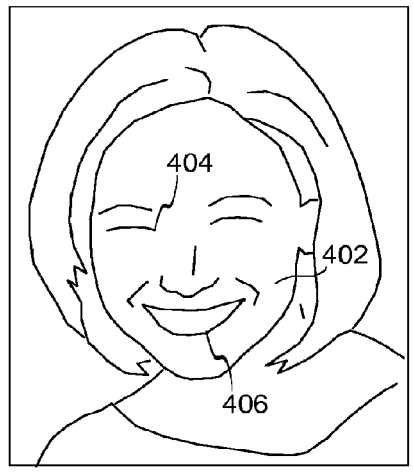
FIG. 4 illustrates an example photo showing a face having closed eyes, according to some implementations.

FIG. 4 illustrates an example photo 400 showing a face 402 having closed eyes 404, according to some implementations. In some implementations, closed eyes are undesired, because they lack a predetermined desired characteristic (e.g., being open).

In block 304, system 102 selects a second photo from the group of photos, where the second photo includes an image of the face. In various implementations, the face in the second photo includes corresponding elements (e.g., eyes, mouth, etc.), where an element in the second photo has the predetermined desired characteristic. For example, the eyes in the second photo may be open.

Figure 5:
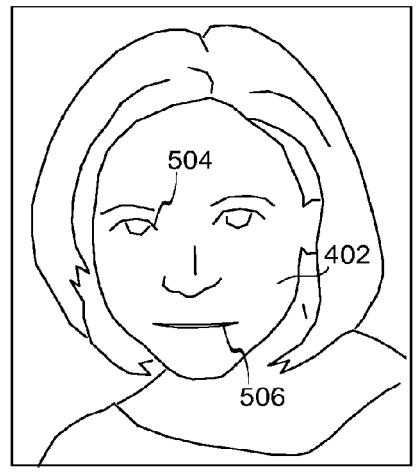
FIG. 5 illustrates an example photo where the same face of FIG. 4 has open eyes, according to some implementations.

FIG. 5 illustrates an example photo 500 where the same face 402 of FIG. 4 has open eyes 504, according to some implementations. In some implementations, open eyes are desired because they have a predetermined desired characteristic (e.g., being open).

In block 306, system 102 replaces the element that lacks the predetermined desired characteristic in the first photo with the element that has the predetermined desired characteristic from the second photo to generate a face composition. For example, system 102 may use face 402 from the first photo as a base image and replace closed eyes 404 in the first photo with open eyes 504 from the second photo.

Figure 6:
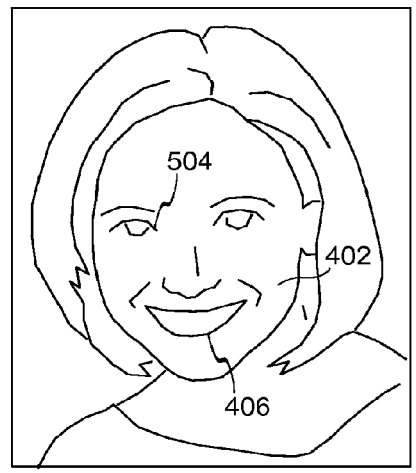
FIG. 6 illustrates an example photo composition, according to some implementations.

FIG. 6 illustrates an example face composition 600, according to some implementations. As shown, FIG. 6 shows the same face 402 from the first photo having open eyes 504 from the second photo. As such, face composition 600 has the desired characteristic (e.g., eyes being open).

For ease of illustration, the example above emphasizes one type of element (e.g., eyes) and one desired characteristic (e.g., being open). Other types and any number of elements and associated desired characteristics are possible. Also, in some implementations, a given photo may have some elements that lack desired characteristics and some elements that have desired characteristics. As such, system 102 may use a combination of elements with desired characteristics to generate a face composition having the desired characteristics.

For example, referring again to FIG. 4, face 402 has closed eyes 404 (undesired) and has a smiling mouth 406 that is smiling (desired). Referring again to FIG. 5, face 402 has open eyes 504 (desired) and has a non-smiling mouth 506 (lacking a desired characteristic of smiling). Similar to the resulting face composition 600 of FIG. 6, system 102 may generate a face composition from any number of photos and from any combination of photos in order to for the face composition to have elements with desired characteristics. For example, if there are multiple faces in a given face composition, system 102 may implement the steps described above to ensure that everyone has their eyes open and that everyone is smiling.

In various implementations, system 102 detects faces in each image, and passes each facial region and each facial feature through a set computer vision classifiers of a facial recognition algorithm to determine each person's emotion, face pose (direction), and whether their eyes are open, etc. In various implementations, the desired characteristics are predetermined. In some implementations, system 102 may determine an overall score for facial region and facial feature, where elements having predetermined desired characteristics are given relatively higher scores than elements that lack the predetermined desired characteristics.

In addition, system 102 performs facial clustering across each photo using a clustering algorithm to determine which faces belong to the same person. In some implementations, system 102 selects one reference photo as the base image, and higher quality faces from other photos are copied and pasted over the faces in the base image. In some implementations, the pasted face is scaled and positioned to best fit in the base image. In some implementations, system 102 may apply blending techniques to minimize visual artifacts from the overlay.

Digital images are typically captured at one exposure level, which is applied to an entire image. High dynamic range (HDR) compositions are multiple photo composites of substantially the same image, where the photo composites are captured at different exposure levels. HDR composites are generally more detailed and/or have more optimal contrast than the photos used in constructing the HDR composition.

Figure 7:
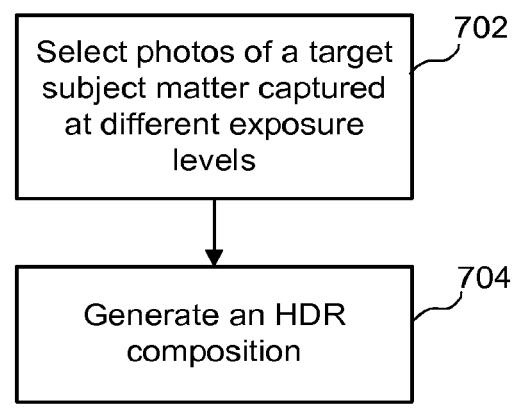
FIG. 7 illustrates an example simplified flow diagram for generating a high dynamic range (HDR) composition, according to some implementations.

FIG. 7 illustrates an example simplified flow diagram for generating an HDR composition, according to some implementations. Referring to both FIGS. 1 and 7, a method is initiated in block 702, where system 102 selects photos from the group of photos, where the selected photos include a target subject matter and where the selected photos are captured in series at different exposure levels. For example, the target subject matter may be a scene, where the scene may include various objects (e.g., monuments, people, etc.).

Figure 8:
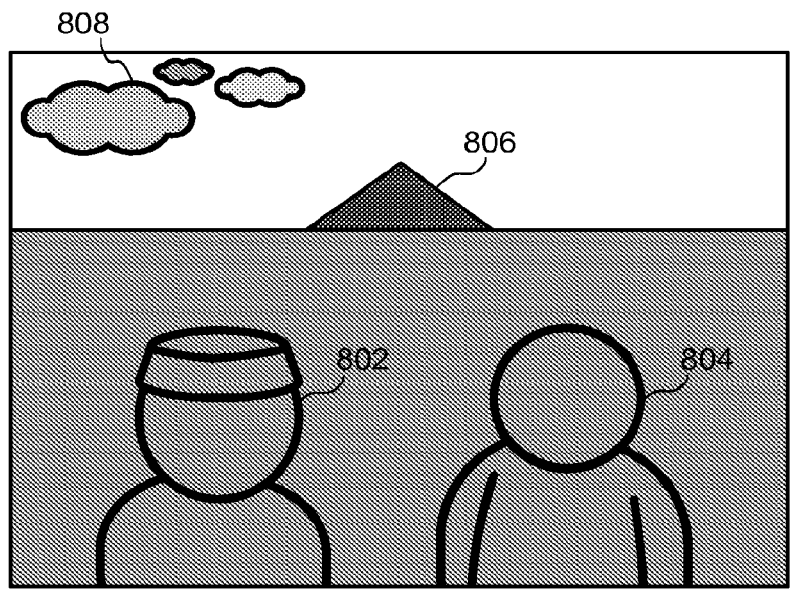
FIG. 8 illustrates an example photo that has a low exposure level, according to some implementations.

FIG. 8 illustrates an example photo 800 that has a low exposure level, according to some implementations. As shown, photo 800 includes images of two people 802 and 804, a pyramid 806, and clouds 808. In this example, the sky portion of photo 800 is much brighter than the landscape and the people. Photo 800 is underexposed and appears dark except for the sky, which is within an optimal range of contrast and detail. As such, the sky portion of photo 800 may be a good candidate for an HDR composition of this scene. The dark portions of photo 800 may also be good candidates for dark shadows in an HDR composition of this scene.

Figure 9:
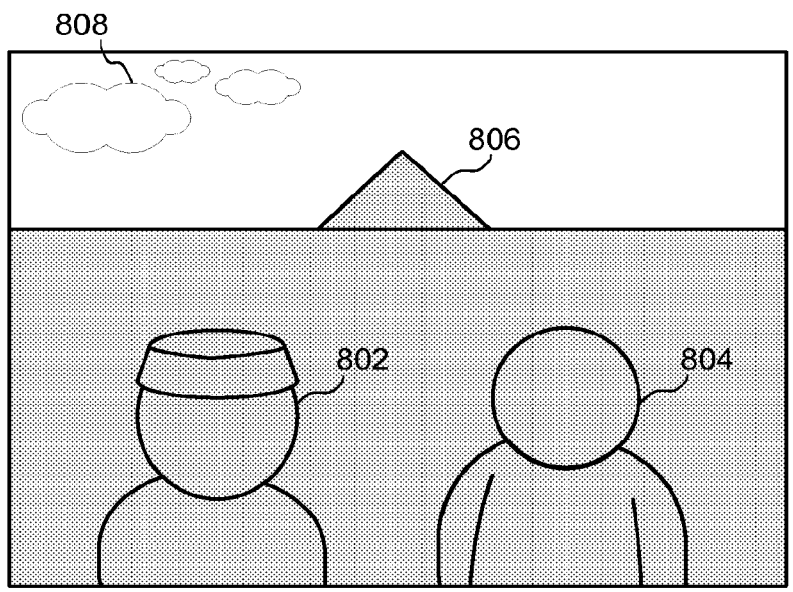
FIG. 9 illustrates an example photo that has a medium-range exposure level, according to some implementations.

FIG. 9 illustrates an example photo 900 that has a medium-range exposure level, according to some implementations. As shown, photo 900 includes images of two people 802 and 804, pyramid 806, which appear somewhat low contrast due to the sky being overexposed and the landscape and people being underexposed. The mid-tones are within an optimal range of detail and may be good candidates for mid-tones in an HDR composition of this scene.

Figure 10:
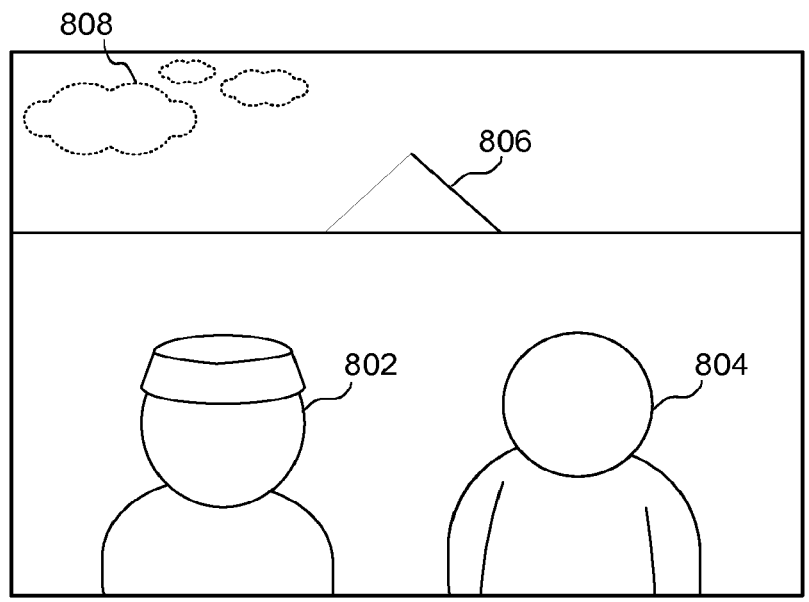
FIG. 10 illustrates an example photo that has a high exposure level, according to some implementations.

FIG. 10 illustrates an example photo 1000 that has a high exposure level, according to some implementations. As shown, photo 1000 includes images of two people 802 and 804, pyramid 806, and clouds 808, which appear light and lacking in detail due being overexposed. Photo 1000's highlights are within an optimal range, and may be utilized in highlight areas in an HDR composition of this scene.

Referring again to FIG. 7, in block 704, system 102 generates an HDR composition of the target subject matter based on exposure level information from the selected photos.

In various implementations, to generate an HDR composition, system 102 first stabilizes, or "rectifies," photos 800, 900, and 1000. In some implementations, system 102 may also normalize photos 800, 900, and 1000 to account for the varying exposure levels between photos. In various implementations, system 102 then applies one or more of a merging algorithm, a tone-mapping algorithm, and an anti-ghosting algorithm in order to merge the exposure levels from the constituent photos 800, 900, and 1000 into a new photo with a high dynamic range image with a large bit depth. In some implementations, system 102 may then convert the HDR composition to a standard bit-depth image with additional tone-mapping and/or quantization.

Figure 11:
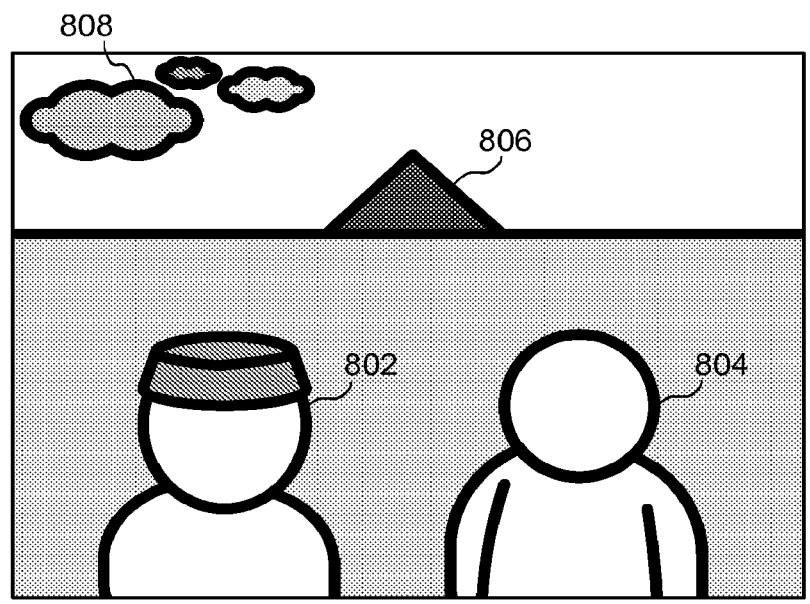
FIG. 11 illustrates an example HDR composition, according to some implementations.

FIG. 11 illustrates an example HDR composition 1100, according to some implementations. As shown, HDR composition 1100 shows two people 802 and 804, pyramid 806, and clouds 808 having a combination of the exposure information of photos 800, 900, and 1000 of respective FIGS. 8, 9, and 10. The particular combination of exposure information will vary and will depend on the specific implementation.

Other photographic scenarios are also possible (e.g., low lighting with insufficient or excessive flash illumination, backlit subject matter, subjects moving at different speeds within a photo, etc.).

Figure 12:
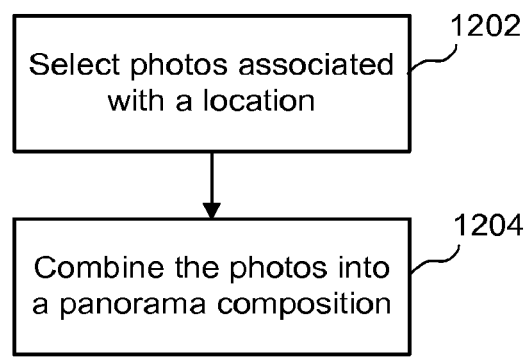
FIG. 12 illustrates an example simplified flow diagram for generating a panorama composition, according to some implementations.

FIG. 12 illustrates an example simplified flow diagram for generating a panorama composition, according to some implementations. Referring to both FIGS. 1 and 12, a method is initiated in block 1202, where system 102 selects photos from the group of photos, where the selected photos are associated with a location. In some implementations, system 102 may select photos that are captured in a similar time window and that share locally-overlapping regions.

Figure 13A:
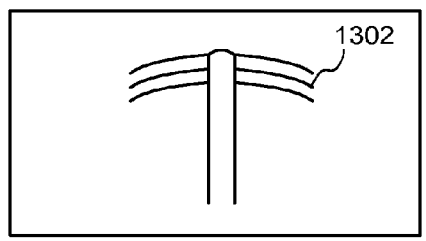
FIGS. 13A, 13B, 13C, and 13D illustrate example simplified photos of objects from different vantage points.
Figure 13B:
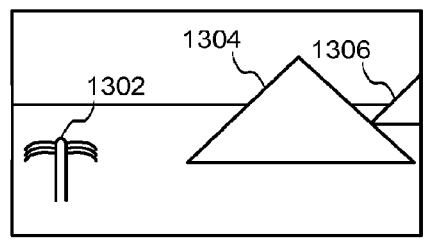
Figure 13C:
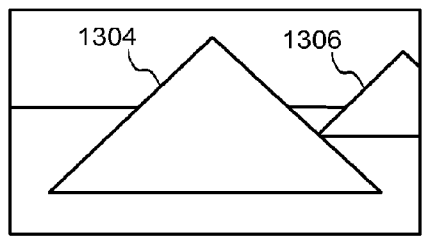
Figure 13D:
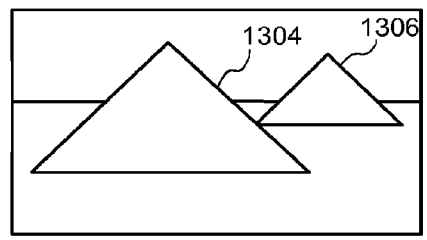

FIGS. 13A, 13B, 13C, and 13D illustrate example simplified photos of objects in a location. FIG. 13A shows a tree 1302. FIG. 13B shows tree 1302, a pyramid 1304, and a portion of a pyramid 1306. FIG. 13C also shows pyramid 1304 and a portion of pyramid 1306. FIG. 13D shows pyramids 1304 and 1306. For ease of illustration, FIGS. 13A, 13B, 13C, and 13D show three objects from different vantages points. A given location or scene may have many more objects, depending on the particular scenario. Furthermore, system 102 may collect numerous photos of a given object from many different vantage points.

Referring again to FIG. 12, in block 1204, system 102 combines the photos into a panorama composition of the location. In various implementations, system 102 applies an algorithm that aligns, normalizes, and stitches the photos of FIGS. 13A, 13B, 13C, and 13D into a single panorama composition. In various implementations, system 102 may generate a confidence measure which can subsequently be used to identify and optionally reject poor quality panoramas.

Figure 14:
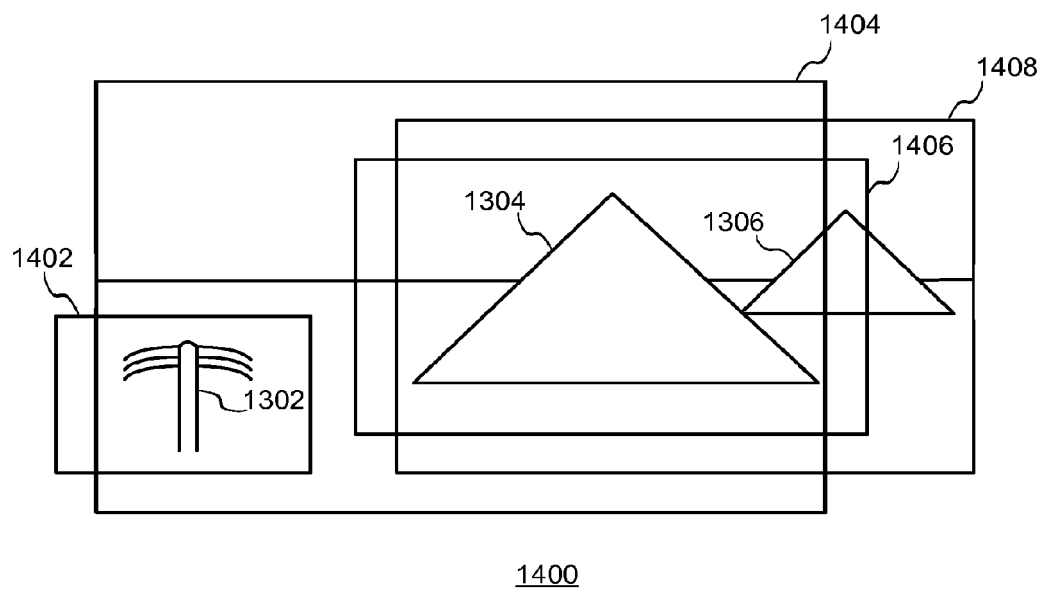
FIG. 14 illustrates an example simplified photo composite, according to some implementations.

FIG. 14 illustrates an example simplified photo composite 1400, according to some implementations. As shown, photo composite 1400 includes a combination of photos 1402, 1404, 1406, and 1408, which correspond to the photos of FIGS. 13A, 13B, 13C, and 13D. Photo composite 1400 shows tree 1302, pyramid 1304, and pyramid 1306. As shown, the photos are registered/aligned into photo composite 1400.

Figure 15:
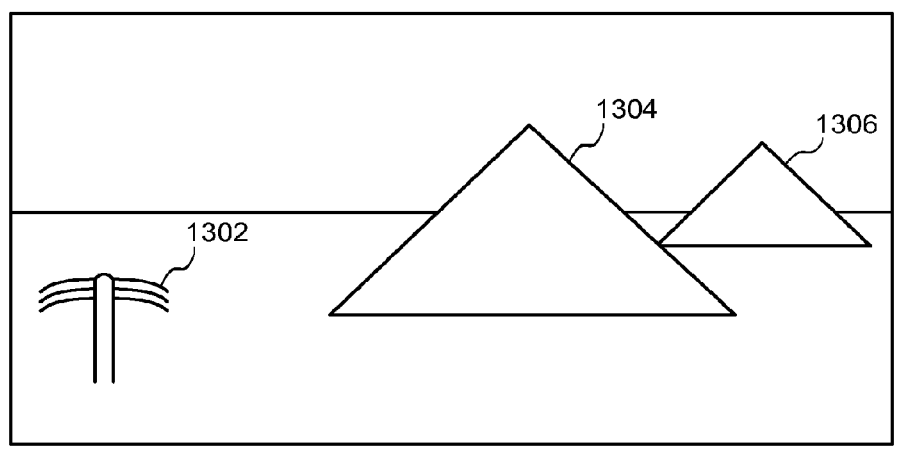
FIG. 15 illustrates an example simplified panorama composition, according to some implementations.

FIG. 15 illustrates an example simplified panorama composition 1500, according to some implementations. As shown, the photos of FIGS. 13A, 13B, 13C, and 13D are blended into a single photo composite 1500 of the location. As shown, photo composite 1500 includes tree 302, pyramid 304, and pyramid 306, which were originally from the different photos of FIGS. 13A, 13B, 13C, and 13D.

For ease of illustration, photo composite 1500 of FIG. 15 shows a simple panorama composition. Depending on the number of objects captured, photos available, points of view, etc., panorama compositions of locations may provide various types panoramas of varying complexities (e.g., 360 degree panoramas, cylindrical panoramas, spherical panoramas, cubical panoramas, etc.). The specific panorama compositions generated will depend on the specific implementation.

Figure 16:
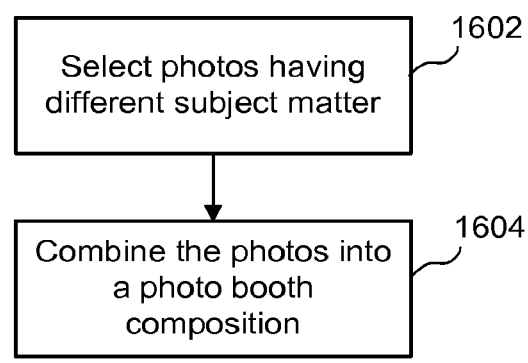
FIG. 16 illustrates an example simplified flow diagram for generating a photo booth composition, according to some implementations.

FIG. 16 illustrates an example simplified flow diagram for generating a photo booth composition, according to some implementations. Referring to both FIGS. 1 and 16, a method is initiated in block 1602, where system 102 selects photos from the group of photos, where the selected photos include different subject matter (e.g., different faces). In various implementations, system 102 selects photos, where one photo shows one or more faces and/or where different photos show different faces. In block 1604, system 102 combines the selected photos into a photo booth composition. In various implementations, system 102 generates a photo booth composition by cropping, scaling, and tiling the selected photos into a new composition.

Figure 17A:
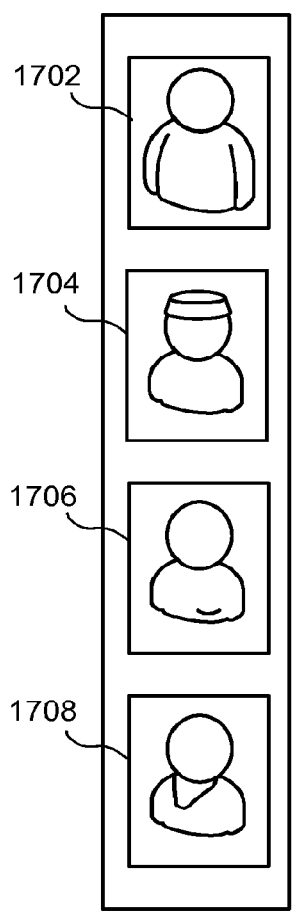
FIGS. 17A and 17B illustrate example simplified photo booth compositions, according to some implementations.
Figure 17B:
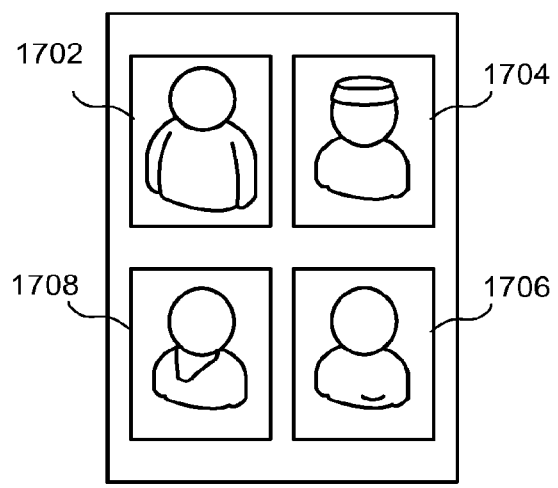

FIGS. 17A and 17B illustrate example simplified photo booth compositions 1700 and 1710, according to some implementations. Referring to FIG. 17A, photo booth composition 1700 includes photos 1702, 1704, 1706, and 1708, each showing a different a person. Photo booth composition 1700 may be configured in various ways, depending on the particular implementation. As shown in FIG. 17A, photo booth composition 1700 resembles a group of photos out of a photo booth. For ease of illustration, each photo 1702, 1704, 1706, and 1708 shows a single face. In some implementations, a given photo may include two or more faces, depending on the particular implementation. With regard to a photo with multiple faces, system 102 may select the photo where the faces each occupy a predetermined number of the image pixels (e.g., at least 8% of the image pixels), and where the faces are relatively close to one another (e.g., as faces often are in a canonical photo booth photo strip).

Other configurations are possible and will depend on the specific implementations. For example, photo booth composition 1710 of FIG. 17B shows another configuration photos 1702, 1704, 1706, and 1708. In some implementations, photo booth composition 1700 may resemble a comic strip. In some implementations, photo booth composition 1700 may be a collage of photos. In some implementations, photo booth composition 1700 may include decorative elements such as a decorative border.

In various implementations, system 102 notifies the user of the composition(s). For example, in some implementations, system 102 may send a message to the user indicating that system 102 has generated a particular composition and has added the composition to the user's upload stream or photo album. In various implementations, system 102 may generate and cause a visual badge to overlay a given composition. In various implementations, system 102 may generate and cause a second or combined visual badge to overlay the composition, where the visual badge indicates the type of media that it is (e.g., face composition, HDR composition, panorama composition, photo booth composition, etc.).

In some implementations, system 102 may provide a message (e.g., "This composition was automatically created from the photos you took.") to the user when the user moves a pointer (e.g., mouses over) over the visual badge.

In some implementations, system 102 may allow for some user interaction or feedback. For example, rather than automatically generating a composition, system 102 may detect photos that would make a composition, then prompt the user to initiate the generation of a face composition, HDR composition, panorama composition, photo booth composition, etc. (e.g., with a single click or selection of a button). In some implementations, system 102 may recommend appropriate types or combinations of types of compositions to the user given the available photos.

In some implementations, multiple types of compositions described herein may be applied to a photo or group of photos. In various implementations, system 102 may generate compositions that include different combinations of face compositions, HDR compositions, panorama compositions, and photo booth compositions, etc. For example, in some implementations, system 102 may generate a face composition within an HDR composition. In some implementations, system 102 may generate a panorama composition using a combination of HDR compositions and/or face compositions. Actual combinations will depend on the specific implementations.

Although the steps, operations, or computations in the method implementations described herein may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in photos. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations automatically generate face compositions, high dynamic range compositions, panorama compositions, and photo booth compositions that users can share with their friends. Such implementations require no manual effort from users, and, in particular, implementations require no user knowledge of how to create compositions. Implementations described herein also increase overall engagement among users in a social networking environment.

Figure 18:
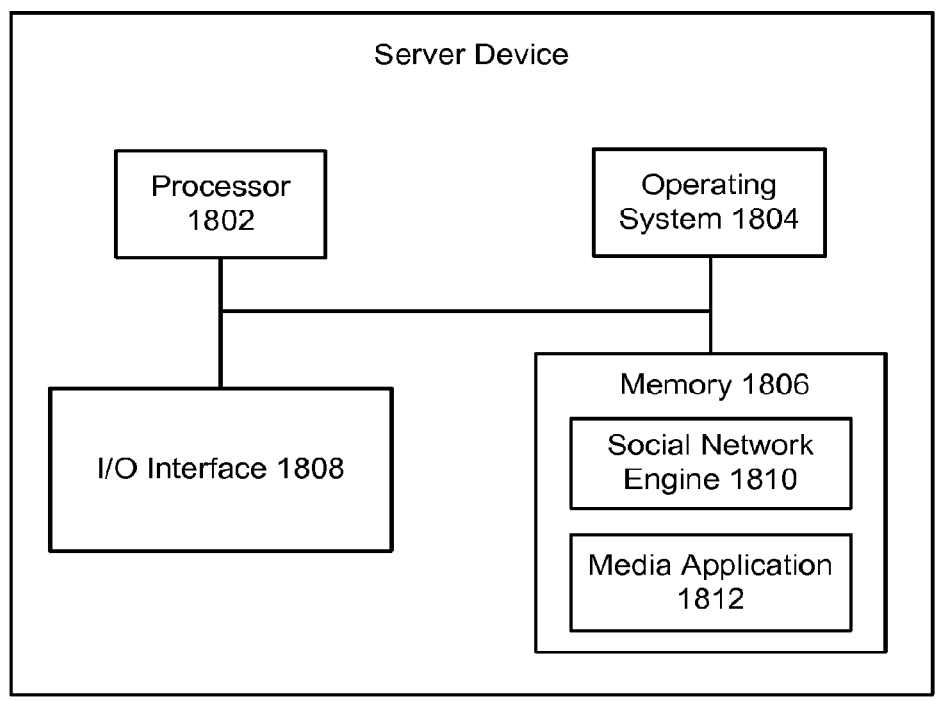
FIG. 18 illustrates a block diagram of an example server device, which may be used to implement the implementations described herein.

FIG. 18 illustrates a block diagram of an example server device 1800, which may be used to implement the implementations described herein. For example, server device 1800 may be used to implement server device 104 of FIG. 1, as well as to perform the method implementations described herein. In some implementations, server device 1800 includes a processor 1802, an operating system 1804, a memory 1806, and an input/output (I/O) interface 1808. Server device 1800 also includes a social network engine 1810 and a media application 1812, which may be stored in memory 1806 or on any other suitable storage location or computer-readable medium. Media application 1812 provides instructions that enable processor 1802 to perform the functions described herein and other functions.

For ease of illustration, FIG. 18 shows one block for each of processor 1802, operating system 1804, memory 1806, I/O interface 1808, social network engine 1810, and media application 1812. These blocks 1802, 1804, 1806, 1808, 1810, and 1812 may represent multiple processors, operating systems, memories, I/O interfaces, social network engines, and media applications. In other implementations, server device 1800 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method to generate a composition, the method comprising:
   clustering a plurality of photos into one or more photo bursts based on one or more clustering criteria;
   identifying a first photo burst, wherein each photo in the first photo burst includes a face;
   selecting a first photo from the first photo burst, wherein the first photo includes a first element that lacks a characteristic, the first element associated with the face;
   selecting a second photo from the first photo burst, wherein the second photo includes a second element that has the characteristic, the second element associated with the face; and
   generating the composition based on the first photo and the second photo, wherein the generating includes:
   selecting the first photo as a base image for the composition; and
   replacing pixels of the first element in the base image by pixels of the second element of the second photo to form the composition.

2. The computer-implemented method of claim 1, wherein the first element is mouth, the method further comprising determining that the first photo includes a non-smiling mouth.

3. The computer-implemented method of claim 2, wherein the second element is mouth, the method further comprising determining that the second photo includes a smiling mouth.

4. The computer-implemented method of claim 1, wherein the first element is closed eyes, the second element is open eyes, and wherein the characteristic is eyes being open.

5. The computer-implemented method of claim 1, wherein replacing the first element in the base image comprises:
   overlaying the second element of the second photo over the first element in the base image.

6. The computer-implemented method of claim 5, wherein generating the composition further comprises:
   prior to overlaying, scaling the second element.

7. The computer-implemented method of claim 5, wherein generating the composition further comprises applying blending techniques to minimize visual artifacts from the overlaying.

8. The computer-implemented method of claim 1, further comprising:
   determining that the first photo includes the first element that lacks the characteristic by:
   detecting the face in the first photo; and
   passing a facial feature of the face through computer vision classifiers.

9. The method of claim 1, further comprising:
   generating a visual badge, wherein the visual badge indicates that the composition is a face composition; and
   causing the visual badge to overlay the composition.

10. The method of claim 1, wherein clustering the plurality of photos into one or more photo bursts based on one or more clustering criteria comprises clustering photos having similar content.

11. The method of claim 1, wherein clustering the plurality of photos into one or more photo bursts based on one or more clustering criteria comprises clustering photos taken within a predetermined time period.

12. A system comprising:
one or more processors; and
a memory coupled to the one or more processors with instructions stored thereon that,
when executed by the one or more processors, cause the one or more processors to:
cluster a plurality of photos into one or more photo bursts based on one or more clustering criteria;
identify a first photo burst, wherein each photo in the first photo burst includes a face;
select a first photo from the first photo burst, wherein the first photo includes a first element that lacks a characteristic, the first element associated with the face;
select a second photo from the first photo burst, wherein the second photo includes a second element that has the characteristic, the second element associated with the face; and
generate a composition based on the first photo and the second photo by selecting the first photo as a base image for the composition and replacing pixels of the first element in the base image by pixels of the second element of the second photo to form the composition.

13. The system of claim 12, wherein the memory has further instructions stored thereon that, when executed by the one or more processors, cause the one or more processors to:
detect the face in the first photo; and
pass a facial feature through computer vision classifiers to determine that the first photo includes the first element that lacks the characteristic.

14. The system of claim 12, wherein the memory has further instructions stored thereon that, when executed by the one or more processors, cause the one or more processors to:
generate a visual badge, wherein the visual badge indicates that the composition is a face composition; and
cause the visual badge to overlay the composition.

15. The system of claim 12, wherein the instructions to cluster the plurality of photos into one or more photo bursts comprise at least one of:
instructions to group photos having similar content; and
instructions to group photos taken within a predetermined time period.

16. A non-transitory computer-readable medium with instructions stored thereon that, when executed by one or more processors, cause the one or more processors to:
cluster a plurality of photos into one or more photo bursts based on one or more clustering criteria;
identify a first photo burst, wherein each photo in the first photo burst includes a face;
select a first photo from the first photo burst as a base image for a composition, wherein the first photo includes a first element that lacks a characteristic, the first element associated with the face;
select a second photo from the first photo burst, wherein the second photo includes a second element that has the characteristic, the second element associated with the face; and
generate the composition by replacing pixels of the first element in the base image by pixels of the second element of the second photo.

17. The non-transitory computer-readable medium of claim 16, wherein the instructions to select the first photo from the first photo burst comprise instructions to:
detect the face in the first photo; and
determine that the face in the first photo includes a non-smiling mouth.

18. The non-transitory computer-readable medium of claim 17, wherein the instructions to select the second photo from the first photo burst comprise instructions to:
detect the face in the second photo; and
determine that the face in the second photo includes a smiling mouth.

19. The non-transitory computer-readable medium of claim 16, wherein the instructions further cause the one or more processors to scale the second element.

20. The non-transitory computer-readable medium of claim 16, wherein the instructions further cause the one or more processors to:
generate a visual badge, wherein the visual badge indicates that the composition is a face composition; and
cause the visual badge to overlay the composition.

* * * * *